United States Patent
Masunaga

[11] Patent Number: 5,936,700
[45] Date of Patent: Aug. 10, 1999

[54] MOUNTING STRUCTURE OF DETACHABLE LENSES TO MAIN SPECTACLES

[75] Inventor: Satoru Masunaga, Fukui, Japan

[73] Assignee: Masunaga Optical Mfg. Co., Ltd., Japan

[21] Appl. No.: 09/157,935

[22] Filed: Sep. 22, 1998

[30] Foreign Application Priority Data

May 7, 1998 [JP] Japan .................................. 10-124949

[51] Int. Cl.⁶ ...................................................... G02C 9/00
[52] U.S. Cl. ................................................. 351/47; 351/57
[58] Field of Search .................................. 351/47, 48, 57, 351/58, 41, 158

[56] References Cited

U.S. PATENT DOCUMENTS

| | | | |
|---|---|---|---|
| 5,416,537 | 5/1995 | Sadler | 351/47 |
| 5,568,207 | 10/1996 | Chao et al. | 351/47 |

FOREIGN PATENT DOCUMENTS

| | | |
|---|---|---|
| 7128620 | 5/1995 | Japan . |
| 9101489 | 4/1997 | Japan . |
| 9105889 | 4/1997 | Japan . |

Primary Examiner—Hung Xuan Dang
Attorney, Agent, or Firm—Lorusso & Loud

[57] ABSTRACT

In a mounting structure of detachable lenses to main spectacles according to the present invention, a detachable lens is provided on the surface side of each lens of main spectacles one over the other, a first magnetically-fitting piece is provided on one of the circumference of each lens and that of each detachable lens mounted to the corresponding lens one over the other, a second magnetically-fitting piece magnetically fitted to the corresponding first magnetically-fitting piece is provided on the other, guide projections are provided symmetrically on one of the circumference of each lens and that of each detachable lens mounted to the corresponding lens one over the other, and a guide hole allowing the corresponding guide projection to guide thereinto is provided in the other.

13 Claims, 9 Drawing Sheets

MOUNTING STRUCTURE OF DETACHABLE LENSES TO MAIN SPECTACLES

BACKGROUND OF THE INVENTION

1. Field of the Invention

This invention relates to a mounting structure of detachable lenses (lenses of sunglasses, auxiliary lenses for accommodation of eye or the like) to main spectacles, and more particularly, to a mounting structure of detachable lenses to main spectacles in the form of magnetically mounting the detachable lenses to the main spectacles.

2. Description of the Prior Art

Figure 14:
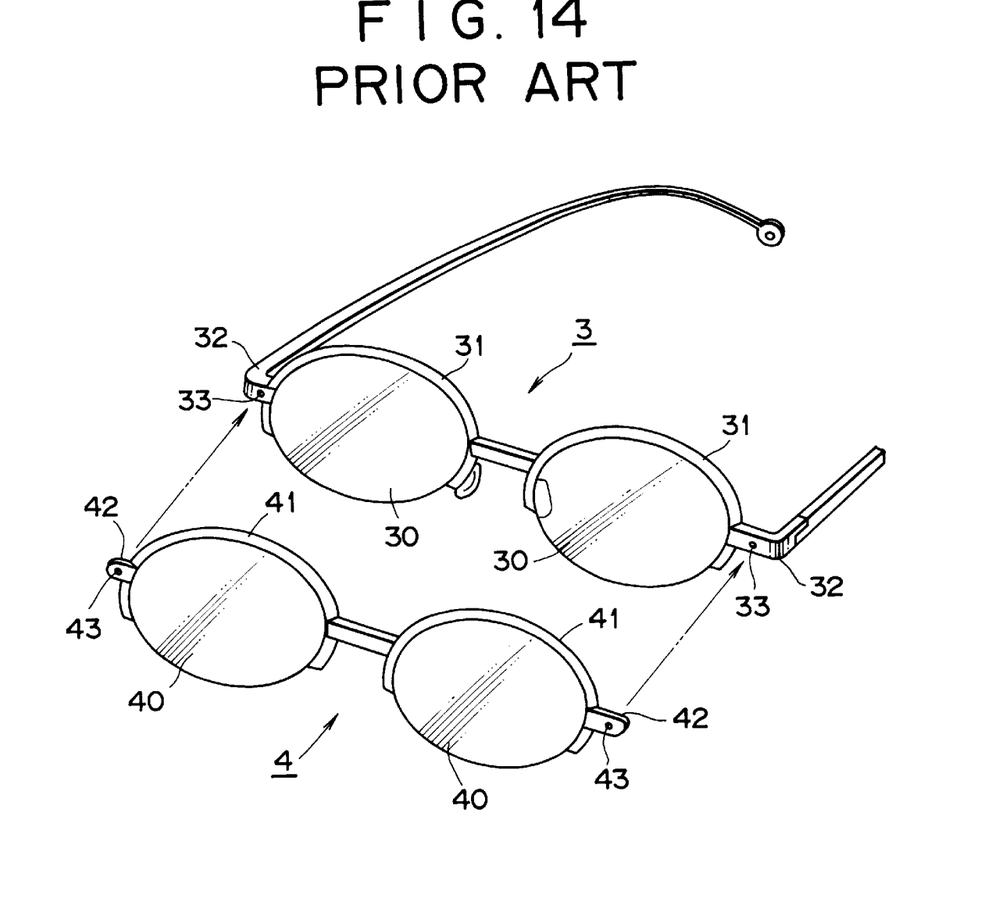
FIG. 14 is an exploded perspective view showing a mounting structure of detachable lenses to main spectacles in a prior art (Japanese Patent Laid-open No. Hei 9-105889).

As shown in FIG. 14, in Japanese Patent Laid-open No. Hei 9-105889, for instance, there is proposed a structure of detachably mounting colored lenses (detachable lenses) 40, 40 of templeless sunglasses 4 to the surface side of lenses 30, 30 of main spectacles 3 one over the other through magnets.

That is, the lenses 30, 30 are fitted to lens frames 31, 31 of the main spectacles 3, and an end piece 32 is fixed to the outer side of each lens frame. First magnetically-fitting portions 33, 33 formed of a magnet are mounted to the end pieces 32 on the surface side of the lenses 30.

The colored lenses 40, 40 substantially equal in size to the lenses 30, 30 are fitted to lens frames 41, 41 of auxiliary spectacles 4. Second magnetically-fitting portions 43, 43 are mounted to the auxiliary spectacles 4 through support pieces 42 at positions corresponding to the first magnetically-fitting portions 33, 33 on the side of the main spectacles 1.

The auxiliary spectacles 4 are mounted to the surface side of the main spectacles 3 by magnetically fitting the second magnetically-fitting portions 43, 43 of the auxiliary spectacles 4 to the first magnetically-fitting portions 33, 33 of the main spectacles 3 one over the other.

According to the mounting structure in the Japanese Patent Laid-open No. Hei 9-105889 described above, the auxiliary spectacles, i.e., the sunglasses are mounted to the main spectacles by magnetically fitting each magnetically-fitting portion on the side of the sunglasses to the corresponding magnetically-fitting portion on the side of the main spectacles one over the other, and therefore, in case of putting each magnetically-fitting portion on the side of the sunglasses close to the corresponding magnetically-fitting portion on the side of the main spectacles, these magnetically-fitting portions are sometimes magnetically fitted to each other even in a state that their magnetically-fitting surfaces are not completely laid one over the other. Thus, the mounting structure in the prior art has the disadvantage of requiring much labor for magnetically fitting the magnetically-fitting portions to each other so as to completely lay their magnetically-fitting surfaces one over the other.

Further, when the magnetically-fitting portions are magnetically fitted to each other in such a state that their magnetically-fitting surfaces are not completely laid one over the other, magnetically-fitting force is reduced according to a reduction of a magnetically-fitting area. Thus, the mounting structure in the prior art also has the disadvantage of easily shifting or releasing the sunglasses from the main spectacles.

SUMMARY OF THE INVENTION

It is an object of the present invention to provide a mounting structure of detachable lenses to main spectacles, wherein it is possible to mount the detachable lenses to the main spectacles simply and surely.

Another object of the present invention is to provide a mounting structure of detachable lenses to main spectacles, wherein it is possible to stabilize the mounting state of the detachable lenses to the main spectacles.

For achieving the above objects, according to the present invention, there is provided the following mounting structure of detachable lenses to main spectacles.

That is, according to the first aspect as defined in claim 1, there is provided a mounting structure of detachable lenses to main spectacles, wherein a detachable lens is provided on the surface side of each of lenses of main spectacles one over the other, a first magnetically-fitting piece is provided on one of the circumference of each lens and that of each detachable lens mounted to the lens one over the other, while a second magnetically-fitting piece magnetically fitted to the corresponding first magnetically-fitting piece is provided on the other, and guide projections are provided symmetrically on one of the circumference of each lens and that of each detachable lens mounted to the lens one over the other, while guide holes allowing the corresponding guide projections to guide thereinto are provided in the other.

According to the second aspect as defined in claim 2, there is provided the mounting structure of detachable lenses to main spectacles according to the first aspect as defined in claim 1, wherein a hook portion hitched on the main spectacles is provided at a position symmetrically corresponding to the first or second magnetically-fitting piece on the circumference of each detachable lens.

According to the third aspect as defined in claim 3, there is provided the mounting structure of detachable lenses to main spectacles according to the first aspect as defined in claim 1, wherein a stopper portion pressed against the main spectacles is provided at a position symmetrically corresponding to the first or second magnetically-fitting piece on the circumference of each detachable lens.

According to the fourth aspect as defined in claim 4, there is provided the mounting structure of detachable lenses to main spectacles according to the first aspect as defined in claim 1, wherein the first or second magnetically-fitting piece provided on each detachable lens is mounted through a support piece bent to the side of the corresponding lens of the main spectacles.

According to the fifth aspect as defined in claim 5, there is provided a mounting structure of detachable lenses to main spectacles, wherein a detachable lens is provided on the surface side of each of lenses of main spectacles one over the other, the detachable lenses are connected together through a bridge portion to form auxiliary spectacles of a detachable type, a first magnetically-fitting piece is provided on one of the side of the auxiliary spectacles and that of the main spectacles, while a second magnetically-fitting piece magnetically fitted to the corresponding first magnetically-fitting piece is provided on the other, and a guide projection is provided in one of at least one place on the circumference of each detachable lens and at least one place, which corresponds to the above one place, on the circumference of each lens, while a guide hole allowing the corresponding guide projection to guide thereinto is provided in the other.

According to the sixth aspect as defined in claim 6, there is provided the mounting structure of detachable lenses to main spectacles according to the fifth aspect as defined in claim 5, wherein a hook portion hitched on the main spectacles is provided at a position symmetrically corresponding to the first or second magnetically-fitting piece on the side of the auxiliary spectacles.

According to the seventh aspect as defined in claim 7, there is provided the mounting structure of detachable lenses to main spectacles according to the fifth aspect as defined in claim 5, wherein a stopper portion pressed against the main spectacles is provided at a position symmetrically corresponding to the first or second magnetically-fitting piece on the side of the auxiliary spectacles.

According to the eighth aspect as defined in claim 8, there is provided the mounting structure of detachable lenses to main spectacles according to the fifth aspect as defined in claim 5, wherein the bridge portion of the auxiliary glasses is hitched on the corresponding bridge portion of the main spectacles.

According to the ninth aspect as defined in claim 9, there is provided the mounting structure of detachable lenses to main spectacles according to the fifth aspect as defined in claim 5, wherein the first or second magnetically-fitting piece provided on the auxiliary spectacles is mounted through a support piece bent to the side of the corresponding lens of the main spectacles.

According to the tenth aspect as defined in claim 10, there is provided the mounting structure of detachable lenses to main spectacles according to the first or fifth aspect as defined in claim 1 or 5, wherein the main spectacles include rimless spectacles.

According to the eleventh aspect as defined in claim 11, there is provided the mounting structure of detachable lenses to main spectacles according to the first or fifth aspect as defined in claim 1 or 5, wherein the guide projection is formed on one of the first and second magnetically-fitting pieces, and the guide hole allowing the guide projection to guide thereinto is formed in the other.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Embodiment 1 (FIGS. 1 to 4)

As shown in FIGS. 1 to 4, a detachable lens 20 substantially equal in size to each of lenses 10, 10 of main spectacles 1 including rimless spectacles is mounted to the surface side of each lens 10 one over the other. Each detachable lens 20 includes a lens of rimless sunglasses.

Figure 1:
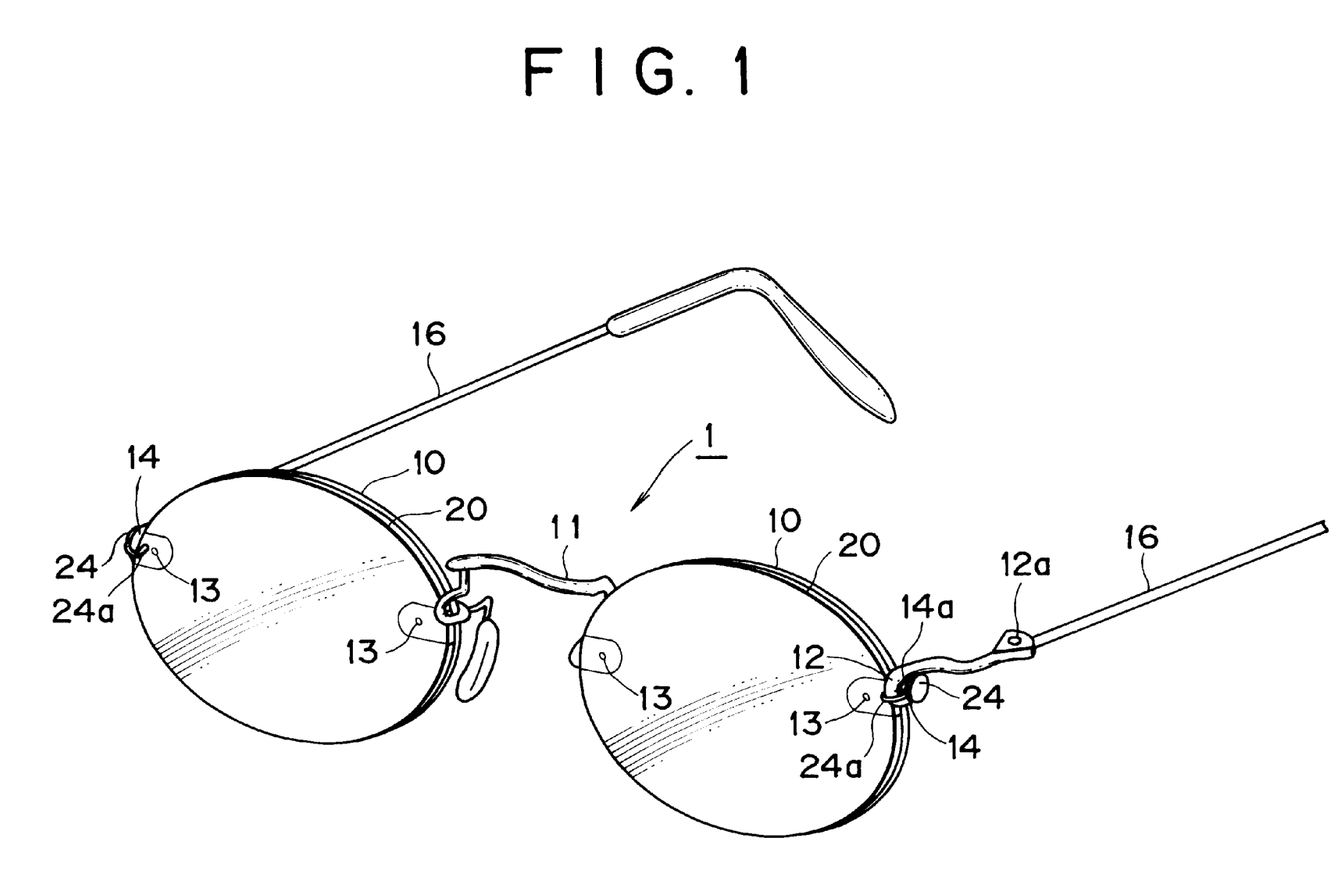
FIG. 1 is a perspective view showing a mounting structure of detachable lenses to main spectacles in the embodiment 1 according to the present invention.
Figure 2:
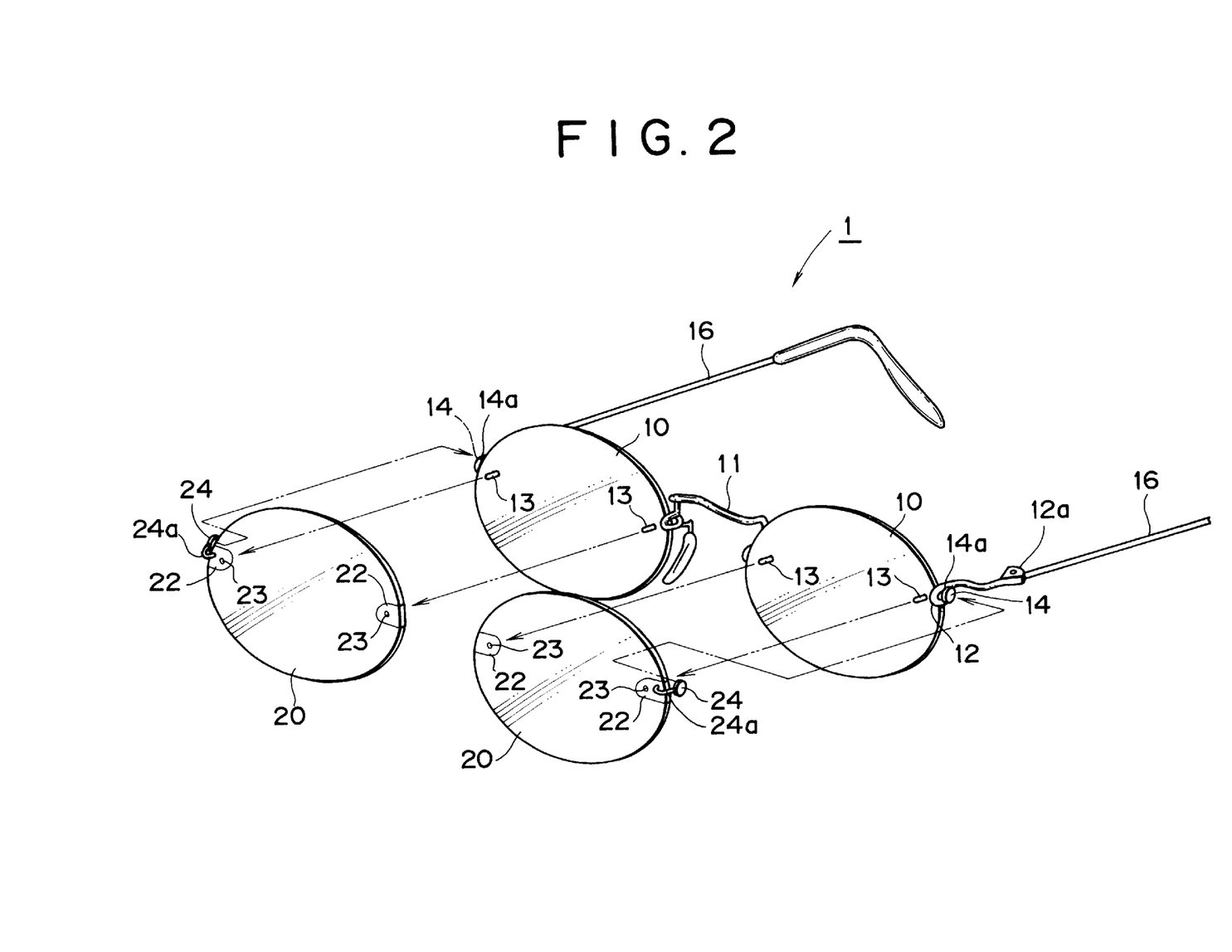
FIG. 2 is an exploded perspective view showing an exploded state of the mounting structure shown in FIG. 1.
Figure 3:
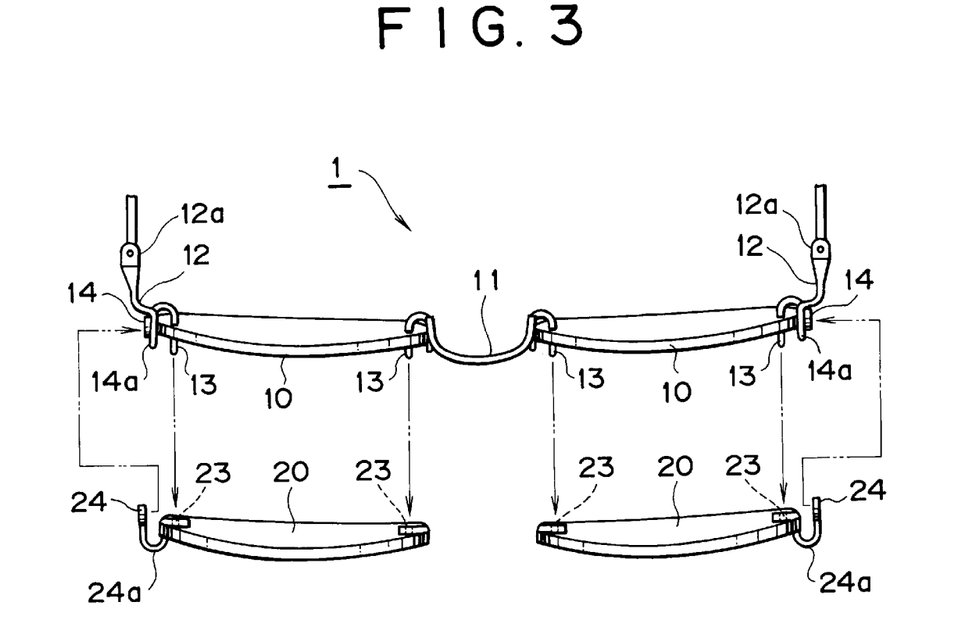
FIG. 3 is an exploded plan view showing an exploded state of the mounting structure shown in FIG. 1.

As shown in FIGS. 2 and 3, a first magnetically-fitting piece 14 is mounted to each of the opposite upper portions of the main spectacles 1 through a support piece 14a on the circumference of each lens 10 of the main spectacles 1, and a guide projection 13 is mounted in a forwardly projected state to each of the opposite upper portions of the main spectacles 1 on the surface side of each lens 10.

In the embodiment, the lenses 10, 10 of the main spectacles 1 are connected together through a bridge portion 11 formed of a wire. In the bridge portion 11, its opposite ends bent to the side of eyes are further bent in a forward direction to form central guide projections 13, 13, and both the guide projections 13, 13 penetrate through the lenses 10 from the eye side so as to project from the surface side.

In the lenses 10, 10 of the main spectacles 1, end pieces 12, 12 are mounted to the opposite upper portions of the main spectacles 1, and a temple 16 is connected to a bearing portion 12a at the distal end of each end piece 12. The support piece 14a and each guide projection 13 on the opposite sides of the main spectacles 1 are formed as one body at the end of each end piece 12, and each forwardly-bent guide projection 13 penetrates through the corresponding lens 10 from the eye side so as to project from the surface side.

A plastic base plate 22 is mounted in an embedded state at a position corresponding to each guide projection 13 on the circumference of each detachable lens 20.

A second magnetically-fitting piece 24 formed of a magnet is mounted to the outside guide plate 22 of each detachable lens 20 through a support piece 24a formed of a bent wire so as to correspond to each first magnetically-fitting piece 14, and a guide hole 23 is formed in the outside base plate 22 so as to correspond to each guide projection 13 on the opposite sides of the main spectacles 1.

The guide hole 23 is also formed in the inside base plate 22 of each detachable lens 20 so as to correspond to each guide projection 13 on the central side of the main spectacles 1.

Figure 4:
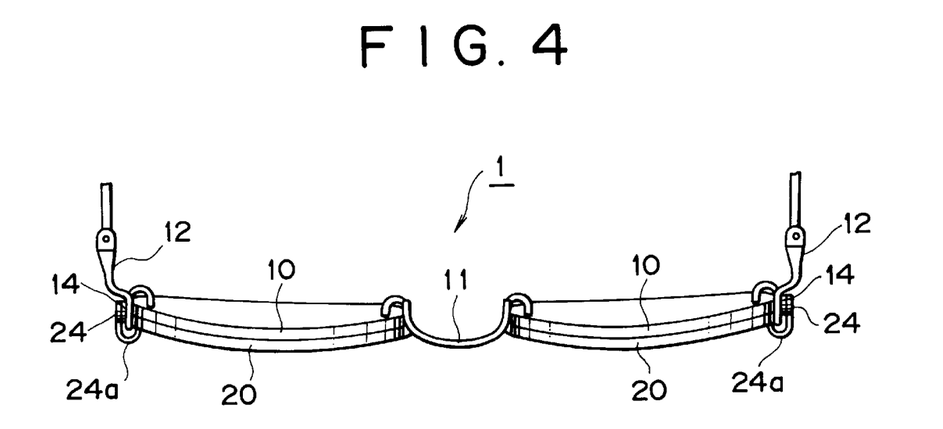
FIG. 4 is a partial plan view showing a state in which a detachable lens in the state shown in FIG. 3 is mounted to each lens of main spectacles.

Each detachable lens 20 is mounted to the front surface of the corresponding lens 10 of the main spectacles 1 one over the other by magnetically fitting each second magnetically-fitting piece 24 to the corresponding first magnetically-fitting piece 14, while inserting each guide projection 13 into the corresponding guide hole 23.

According to the mounting structure of the detachable lenses to the main spectacles in the embodiment, the following effects may be provided. That is, first, the detachable lenses 20, 20 may be mounted to the lenses 10, 10 of the main spectacles 1 extremely simply and surely by guiding each guide projection 13 of each lens 10 into the corresponding guide hole 23 of each detachable lens 20 in an inserting manner, and then magnetically fitting each first magnetically-fitting piece 14 to the corresponding second magnetically-fitting piece 24 to each other.

Second, in the lenses 10, 10 of the main spectacles 1 and the detachable lenses 20, 20, since the magnetically-fitting pieces 14, 24 corresponding to each other are magnetically fitted to each other, and besides, each guide projection 13 is inserted into the corresponding guide hole 23, it is possible to prevent each detachable lens 20 from being shifted or released from the corresponding lens 10 of the main spectacles 1.

Third, since the second magnetically-fitting piece 24 is mounted to the side of each detachable lens 20 through the support piece 24a, a field of vision is hardly obstructed by the magnetically fitting pieces 14, 24 in use.

Fourth, since the main spectacles 1 include the rimless spectacles with no lens frame, and each detachable lens 20 has no lens frame, it is possible to provide spectacles lighter in weight and wider in field of vision than spectacles with lens frames.

Embodiment 2

Figure 5:
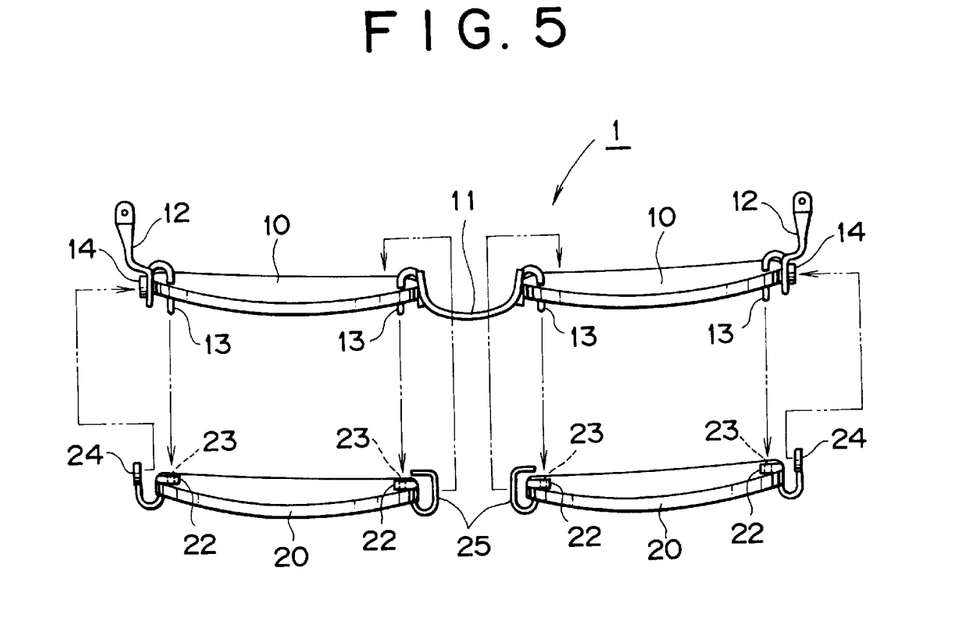
FIG. 5 is an exploded plan view showing an exploded state of a mounting structure of detachable lenses to main spectacles in the embodiment 2 according to the present invention.

As shown in FIG. 5, a base plate 22 is mounted in an embedded state to each of the opposite sides of each detachable lens 20 similarly to the embodiment 1. A guide hole 23 allowing the corresponding guide projection 13 to insert and guide thereinto is formed in each base plate 22 at a position corresponding to each end of a bridge portion 11 of the main spectacles 1, and besides, a hook portion 25 formed of a wire bent to be effective in being hitched on the peripheral edge of each lens 10 of the main spectacles 1 is fixed to each base plate 22.

When each detachable lens 20 is mounted to the corresponding lens 10, each second magnetically-fitting piece 24 is magnetically fitted to the corresponding first magnetically-fitting piece 14, each guide projection 13 is inserted into the corresponding guide hole 23, and each hook portion 25 is hitched on the peripheral edge of the corresponding lens 10 of the main spectacles 1.

The structure of other portions of each detachable lens 20 and that of the main spectacles 1 are identical with those in case of the mounting structure in the embodiment 1.

According to the mounting structure in the embodiment 2, since each detachable lens 20 is mounted to the corresponding lens 10 by magnetically fitting each second magnetically-fitting piece 24 to the corresponding first magnetically-fitting piece 14, then inserting each guide projection 13 into the corresponding guide hole 13, and besides, hitching each hook portion 25 on the peripheral edge of the corresponding lens 10 of the main spectacles 1, the detachable lenses 20 may be mounted to the lenses 10, 10 of the main spectacles 1 more surely and stably, and it becomes harder to release each detachable lens 20 from the corresponding lens 10.

Other operations and effects of the mounting structure in the embodiment 2 are substantially identical with those of the mounting structure in the embodiment 1, and hence, the description thereof will be omitted.

Embodiment 3

Figure 6:
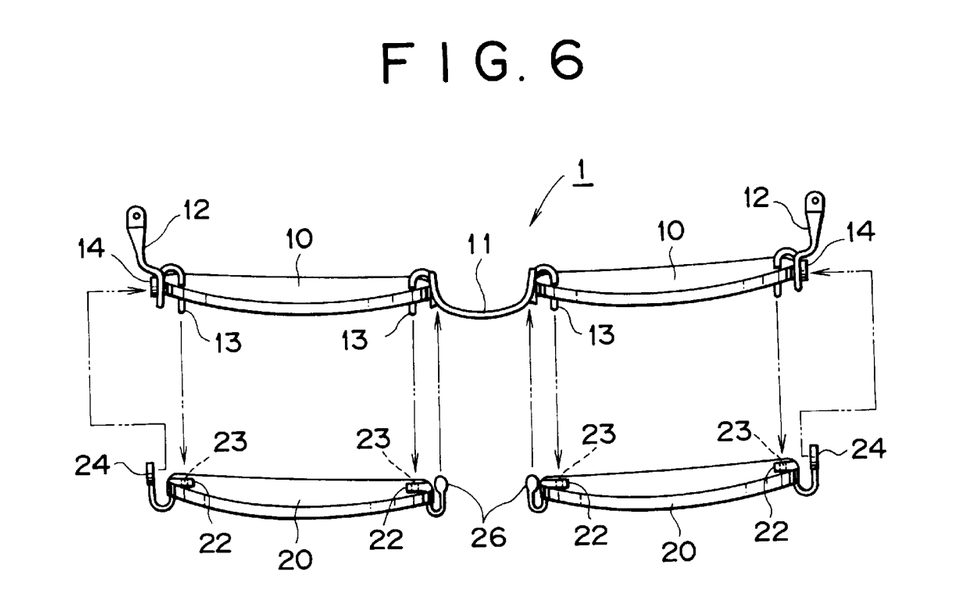
FIG. 6 is an exploded plan view showing an exploded state of a mounting structure of detachable lenses to main spectacles in the embodiment 3 according to the present invention.

As shown in FIG. 6, a base plate 22 is mounted in an embedded state to each of the opposite sides of each detachable lens 20 similarly to the embodiment 1. A guide hole 23 allowing the corresponding guide projection 13 to insert and guide thereinto is formed in each base plate 22 at a position corresponding to each end of a bridge portion 11 of the main spectacles 1, and besides, a metal stopper portion 26 bent to be effective in being pressed against the peripheral edge of the corresponding lens 10 is fixed to each base plate 22.

When each detachable lens 20 is mounted to the corresponding lens 10, each second magnetically-fitting piece 24 is magnetically fitted to the corresponding first magnetically-fitting piece 14, each guide projection 13 is inserted into the corresponding guide hole 23, and each stopper portion 26 is pressed against the peripheral edge of the corresponding lens 10.

The structure of other portions of each detachable lens 20 and that of the main spectacles 1 are identical with those in case of the mounting structure in the embodiment 1.

According to the mounting structure in the embodiment 3, since each detachable lens 20 is mounted to the corresponding lens 10 by magnetically fitting each second magnetically-fitting piece 24 to the corresponding first magnetically-fitting piece 14, then inserting each guide projection 13 into the corresponding guide hole 23, and besides, pressing each stopper portion 25 against the peripheral edge of the corresponding lens 10 of the main spectacles 1, the detachable lenses 20 may be mounted to the lenses 10, 10 of the main spectacles 1 more surely and stably, and it becomes harder to release each detachable lens 20 from the corresponding lens 10.

Other operations and effects of the mounting structure in the embodiment 3 are substantially identical with those of the mounting structure in the embodiment 1, and hence, the description thereof will be omitted.

Embodiment 4

Figure 7:
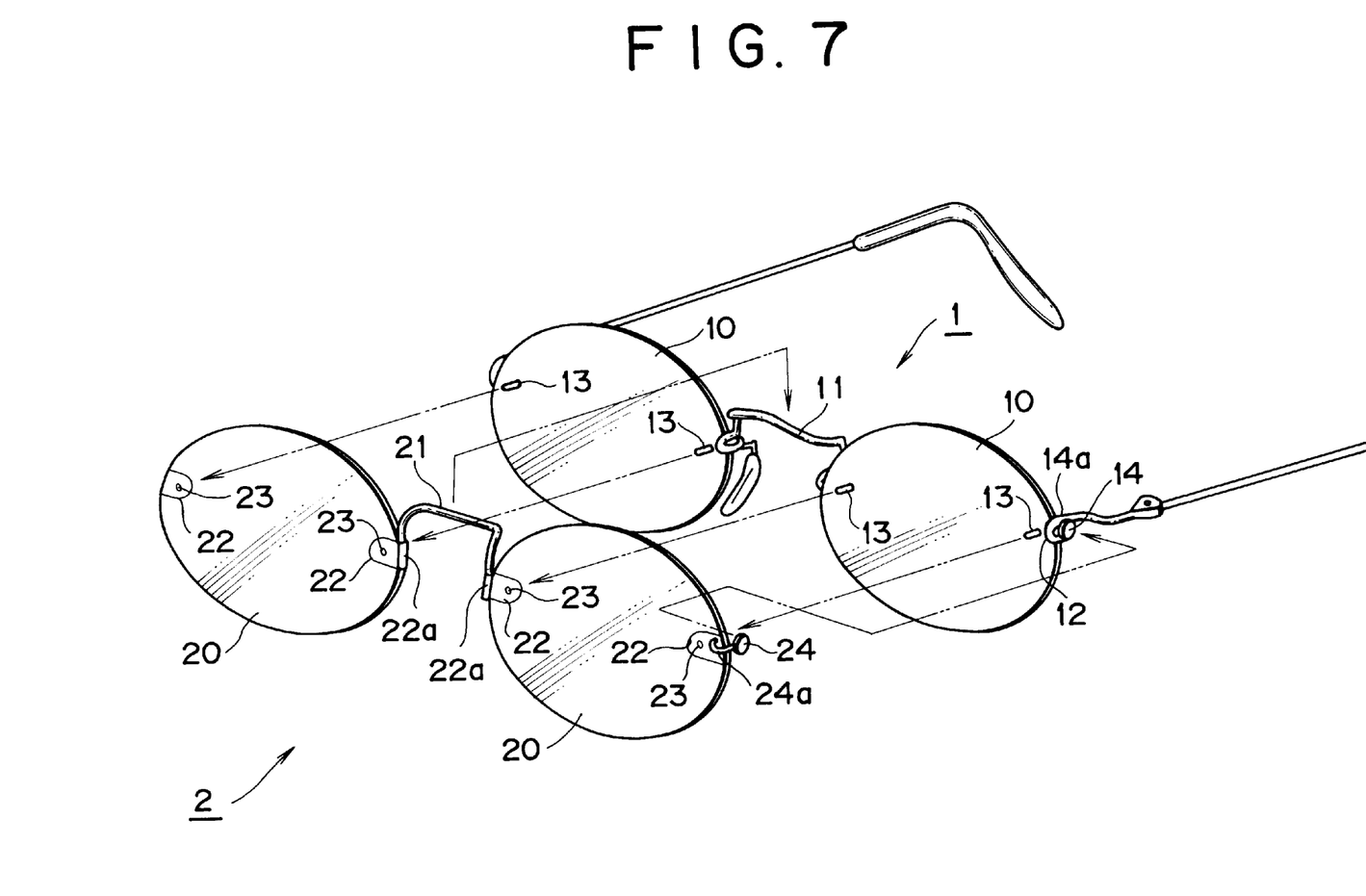
FIG. 7 is an exploded perspective view showing an exploded state of a mounting structure of detachable lenses to main spectacles in the embodiment 4 according to the present invention.

As shown in FIG. 7, in the main spectacles 1 including rimless spectacles, a first magnetically-fitting piece 14 is mounted only on the outside of one lens 10 through a support piece 14a formed to be one with an end piece 12, and the other lens 10 has no first magnetically-fitting piece 14.

The structure of other portions of the main spectacles 1 is identical with that in case of the mounting structure in the embodiment 1.

Detachable lenses 20, 20 including lenses of sunglasses are connected together through a bridge portion 21 formed of a wire to form auxiliary spectacles 2, and a second magnetically-fitting piece 24 is mounted only to one detachable lens 20 so as to correspond to the first magnetically-fitting piece 14.

A guide hole 23 is formed in each of side base plates 22 close to each other in the detachable lenses 20, 20 similarly to the mounting structure in the embodiment 1, and besides, the downwardly-bent opposite ends of the bridge portion 21 formed of the wire are fixed to these side base plates 22.

The bridge portion 21 is bent to the side of the bridge portion 11 of the main spectacles 1 and is hitched on the bridge portion 11.

The structure of other portions of each detachable lens 20 is identical with that in case of the mounting structure in the embodiment 1.

In case of the mounting structure in the embodiment 4, when each detachable lens 20 is mounted to the corresponding lens 10 of the main spectacles 1 one over the other, the first and second magnetically-fitting pieces 14, 24 are magnetically fitted to each other, each guide projection 13 is inserted into the corresponding guide hole 23, and the bridge portion 21 of the auxiliary spectacles 2 is hitched on the bridge portion 11 of the main spectacles 1.

According to the mounting structure in the embodiment 4, it is possible to provide a more simple structure with the use of only one first magnetically-fitting piece 14 and only one second magnetically-fitting piece 24. Besides, since the bridge portion 21 of the auxiliary spectacles 2 is hitched on the bridge portion 11 of the main spectacles 1, the auxiliary spectacles 2 may be mounted to the main spectacles 1 more surely and stably, and it becomes harder to release the auxiliary spectacles 2 from the main spectacles 1.

Since the detachable lenses 20, 20 are connected together through the bridge portion 21 to form the auxiliary spectacles 2, it is possible to mount the detachable lenses 20, 20 to the lenses 10, 10 of the main spectacles 1 more simply.

Other structure, operations and effects of the mounting structure in the embodiment 4 are identical with those of the mounting structure in the embodiment 1, and hence, the description thereof will be omitted.

Embodiment 5

Figure 8:
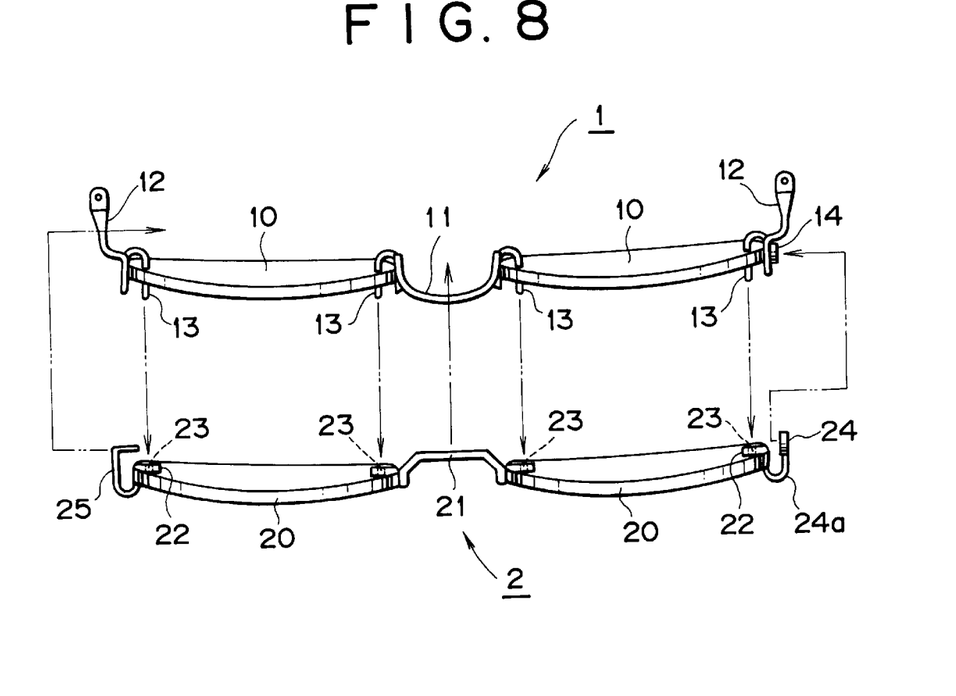
FIG. 8 is an exploded plan view showing an exploded state of a mounting structure of detachable lenses to main spectacles in the embodiment 5 according to the present invention.

As shown in FIG. 8, a guide hole 23 is formed in an outside base plate 22 of a detachable lens 20 mounted with no second magnetically-fitting piece 24 in the auxiliary spectacles 2, similarly to a case of the mounting structure in the embodiment 4, and besides, a hook portion 25 formed of a wire bent to be effective in being hitched on the side edge of the corresponding lens 10 of the main spectacles 1 is fixed to this outside base plate 22.

The structure of the main spectacles 1 and that of other portions of the auxiliary spectacles 2 are identical with those in case of the mounting structure in the embodiment 4.

In case of the mounting structure in the embodiment 5, when the auxiliary spectacles 2 are mounted to the surface side of the main spectacles 1 one over the other, first and second magnetically-fitting pieces 14, 24 are magnetically fitted to each other, each guide projection 13 is inserted into the corresponding guide hole 23, a bridge portion 21 of the auxiliary spectacles 2 is hitched on a bridge portion 11 of the main spectacles 1, and the hook portion 25 is further hitched on the side edge of the corresponding lens 10.

According to the mounting structure in the embodiment 5, since the hook portion 25 hitched on the edge of the lens 10 corresponding to one detachable lens 20 is mounted to one detachable lens 20 as described above, the auxiliary spectacles 2 may be mounted to the main spectacles 1 more surely and stably, and it becomes harder to release the auxiliary spectacles 2 from the main spectacles 1.

Other structure, operations and effects of the mounting structure in the embodiment 5 are identical with those of the mounting structure in the embodiment 4, and hence, the description thereof will be omitted.

Embodiment 6

Figure 9:
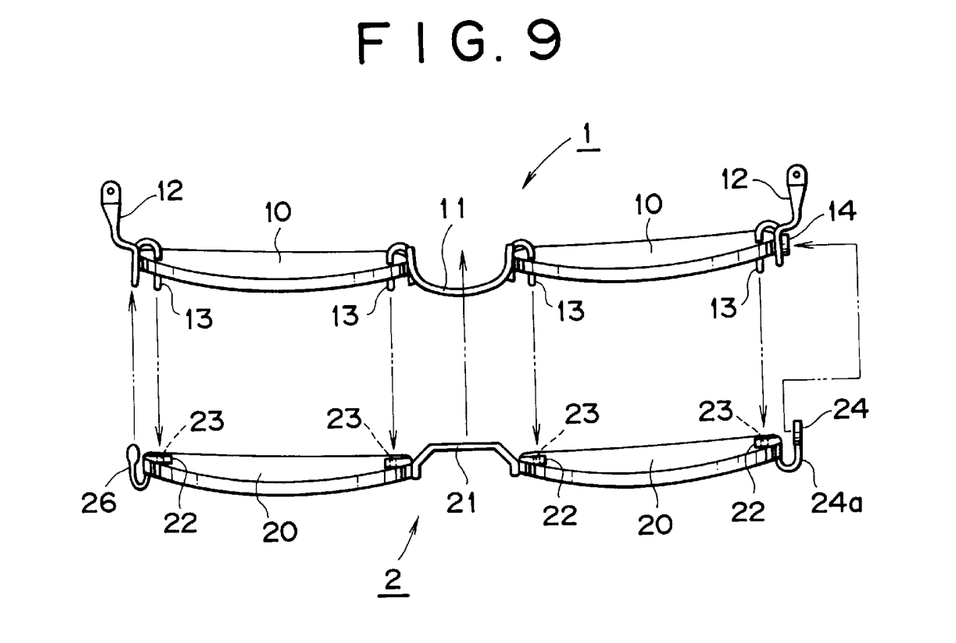
FIG. 9 is an exploded plan view showing an exploded state of a mounting structure of detachable lenses to main spectacles in the embodiment 6 according to the present invention.

As shown in FIG. 9, a guide hole 23 is formed in an outside base plate 22 of a detachable lens 20 mounted with no second magnetically-fitting piece 24 in the auxiliary spectacles 2, and besides, a metal stopper portion 26 bent to be effective in being pressed against the side edge of the corresponding lens 10 of the main spectacles 1 is fixed to this outside base plate 22.

The structure of the main spectacles 1 and that of other portions of the auxiliary spectacles 2 are identical with that in case of the mounting structure in the embodiment 4.

In case of the mounting structure in the embodiment 6, when the auxiliary spectacles 2 are mounted to the surface side of the main spectacles 1 one over the other, first and second magnetically-fitting pieces 14, 24 are magnetically fitted to each other, each guide projection 13 is inserted into the corresponding guide hole 23, a bridge portion 21 of the auxiliary spectacles 2 is hitched on a bridge portion 11 of the main spectacles 1, and the stopper portion 26 on the side of the auxiliary spectacles 2 is further pressed against the side edge of the corresponding lens 10.

According to the mounting structure in the embodiment 6, since the stopper portion 26 pressed against the edge of the lens corresponding to one detachable lens 20 is mounted to one detachable lens 20 as described above, the auxiliary spectacles 2 may be mounted to the main spectacles 1 more surely and stably, and it becomes harder to release the auxiliary spectacles 2 from the main spectacles 1.

Other structure, operations and effects of the mounting structure in the embodiment 6 are identical with those of the mounting structure in the embodiment 4, and hence, the description thereof will be omitted.

Embodiment 7

Figure 10:
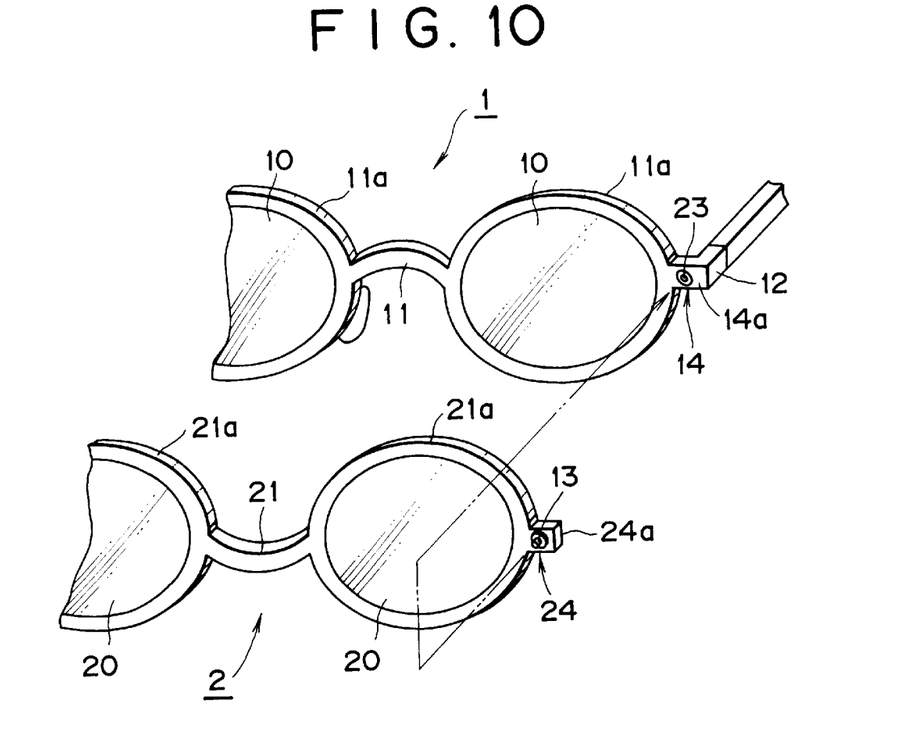
FIG. 10 is a partially exploded perspective view showing an exploded state of a mounting structure of detachable lenses to main spectacles in the embodiment 7 according to the present invention.

As shown in FIG. 10, the main spectacles 1 and the auxiliary spectacles 2 have respectively lens frames 11a, 12a formed to be one with bridge portions 11, 21, and each lens 10 and each detachable lens 20 are respectively fitted into the lens frames 11a, 21a.

Each lens 10 of the main spectacles 1 and each lens 20 of the auxiliary spectacles 2 respectively have lens frames 11a, 21a formed to be one with bridge portions 11, 21.

An end piece 12 is formed to be one with each of the opposite sides of each lens frame 11a, and a first magnetically-fitting piece 14 in the shape of a short cylinder is mounted to each end piece 12 so as to penetrate through the end piece from the eye side to the surface side.

On the other hand, a support piece 24a is formed to be one with each lens frame 21a on the side of the auxiliary spectacles 2, and a second magnetically-fitting piece 24 in the shape of a cylinder is mounted to the support piece 24a so as to penetrate through the support piece.

Figure 11:
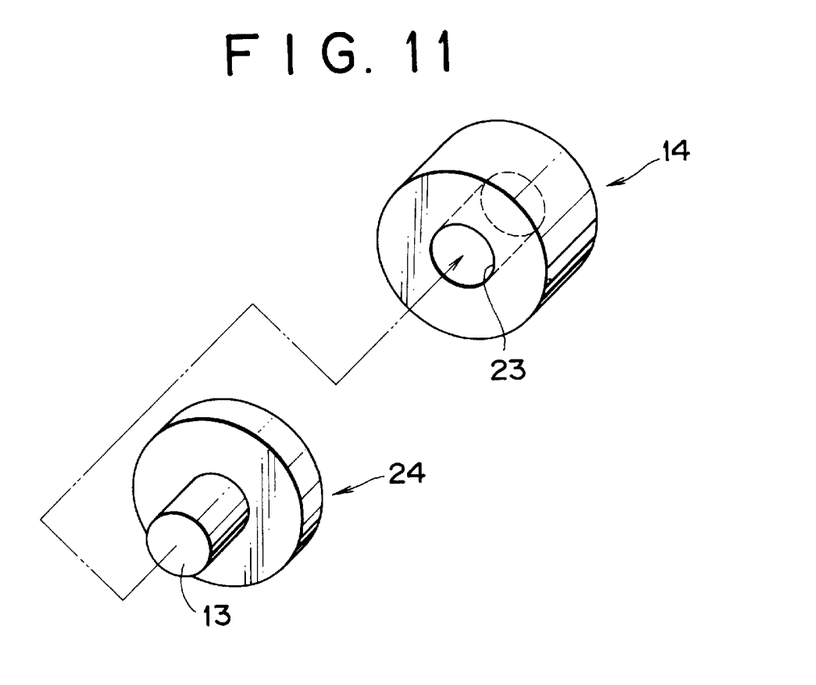
FIG. 11 is an enlarged perspective view showing an enlarged state of first and second magnetically-fitting pieces for use in the embodiment 7.

As shown in FIGS. 10 and 11, a guide hole 23 is formed in the center of each first magnetically-fitting piece 14, and a guide projection 13 guided into the corresponding guide hole 23 is formed on each second magnetically-fitting piece 24.

According to the mounting structure in the embodiment 7, since the first and second magnetically-fitting pieces 14, 24 are magnetically fitted to each other the moment that each guide projection 13 on the side of the auxiliary spectacles 2 is guided into the corresponding guide hole 23 of the main spectacles 1, the detachable lenses 20, 20 of the auxiliary spectacles 2 may be mounted to the lenses 10, 10 of the main spectacles 1 more simply.

Further, since the magnetically-fitting piece 14 or 24 and the guide hole 23 or the guide projection 13 are formed as one body, the number of parts is reduced, resulting in a more simplification of steps of assembly.

Other embodiments

In case of the mounting structure in the embodiments 1 to 3, the first and second magnetically-fitting pieces 14, 24 are provided on the side of the lenses 10, 20. However, it is to be noted that these magnetically-fitting pieces 14, 24 may be provided at the other portions on the circumference of the lenses 10, 20.

In case of the mounting structure in the embodiments 1 to 6, the first magnetically-fitting piece 14 is provided on the lens 10, and the second magnetically-fitting piece 24 is provided on the detachable lens 20. However, it is to be noted that the first magnetically-fitting piece 14 may be provided on the detachable lens 20, and the second magnetically-fitting piece 24 may be provided on the lens 10, reversely to the above structure.

In case of the mounting structure in the embodiments 1 to 6, the guide projections 13, 13 are provided on each lens 10, and the guide holes 23, 23 are formed in each detachable lens 20. However, it is to be noted that the guide projections 13, 13 may be provided on each detachable lens, and the guide holes 23, 23 may be formed in each lens 10, reversely to the above structure.

In case of the mounting structure in the embodiments 1 to 6, the guide projection 13 is provided in two places of each lens 10, and the guide hole 23 is provided in two places of each detachable lens 20. However, it is to be noted that the guide projection 13 and the guide hole 23 may be provided in one or two or more places of each lens 10 or each detachable lens 20.

The main spectacles 1 in case of the mounting structure in the embodiments 1 to 6 include the rimless spectacles with no lens frame. However, it is to be noted that spectacles with lens frames may be also available.

In case of the mounting structure in the embodiments 1 to 6, the first and second magnetically-fitting pieces 14, 24 are formed of the magnet. However, it is to be noted that one of the first and second magnetically-fitting pieces may be formed of the magnet, and the other may be formed of magnetic metal.

Figure 12:
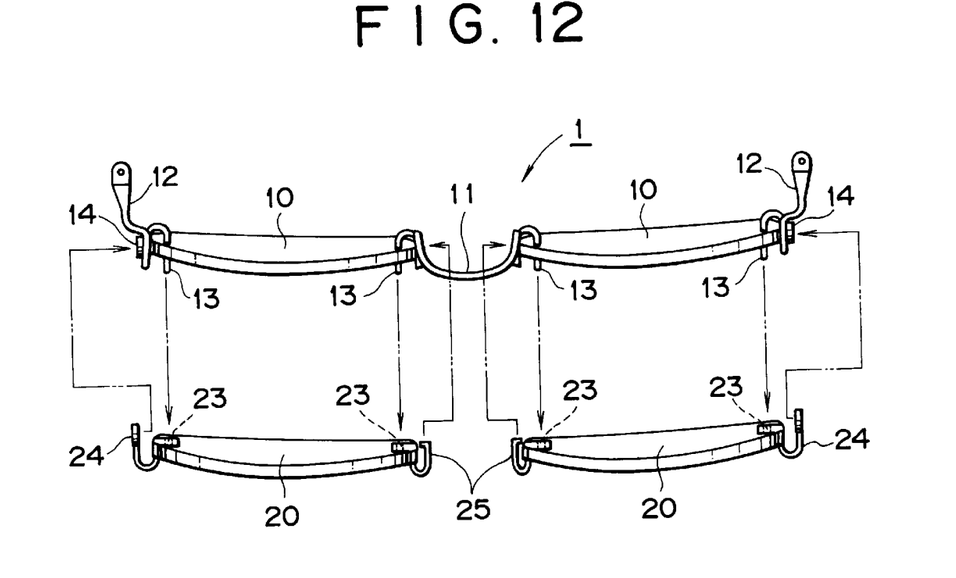
FIG. 12 is an exploded plan view showing an exploded state of a mounting structure of detachable lenses to main spectacles in the further embodiment according to the present invention.
Figure 13:
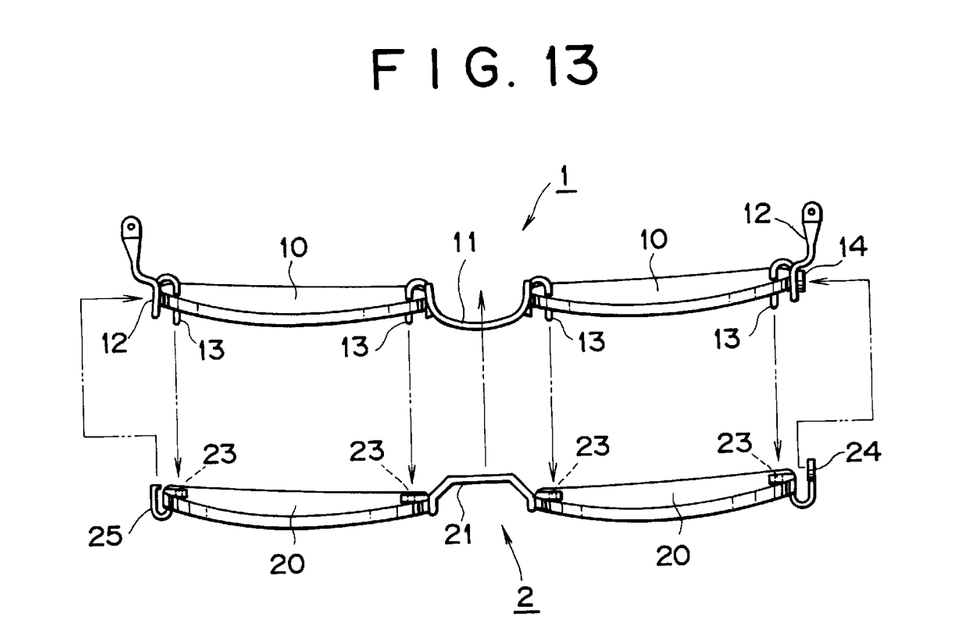
FIG. 13 is an exploded plan view showing an exploded state of a mounting structure of detachable lenses to main spectacles in the still further embodiment according to the present invention.

The hook portion 25 in case of the mounting structure in the embodiment 2 or 5 is formed of the wire bent to be effective in being hitched on the peripheral edge of the corresponding lens 10 of the main spectacles 1. However, it is to be noted that the hook portion may be formed of a wire bent to be effective in being hitched on the opposite ends of the corresponding bridge portion 11 (See FIG. 12) or one end piece 12 (See FIG. 13), as shown in FIGS. 12 or 13, for instance.

In case of the mounting structure in the embodiment 7, the guide hole 23 is formed in the first magnetically-fitting piece 14, and the guide projection 13 is formed on the second magnetically-fitting piece 24. However, it is to be noted that the guide hole 23 may be formed in the second magnetically-fitting piece 24, and the guide projection 13 may be formed on the first magnetically-fitting piece 14, reversely to the above structure.

In case of the mounting structure in the embodiment 7, the first and second magnetically-fitting pieces 14, 24 are mounted to the spectacles with the lens frames. However, it is to be noted that these magnetically-fitting pieces may be mounted to the lenses of the rimless spectacles.

According to the mounting structure of detachable lenses to main spectacles according to the present invention as defined in claim 1, the following effects may be provided. That is, first, since each lens 10 and each detachable lens 20 are provided with the guide projections 13, 13 and the guide holes 23 corresponding to these guide projections, in addition to the first and second magnetically-fitting pieces 14, 24, the detachable lenses 20 may be mounted to the lenses 10 of the main spectacles 1 extremely simply and surely by guiding each guide projection 13 into the corresponding guide hole 23 and then magnetically fitting the first and second magnetically-fitting pieces 14, 24 to each other.

Second, in the lenses 10, 10 of the main spectacles and the detachable lenses 20 corresponding to the lenses 10, 10, since not only the magnetically-fitting pieces 14, 24 are magnetically fitted to each other, but also each guide projection 13 is guided into the corresponding guide hole 23, each detachable lens 20 is hardly shifted or released from the corresponding lens 10 of the main spectacles 1.

According to the mounting structure of detachable lenses to main spectacles according to the present invention as defined in claim 2, since the hook portion 25 hitched on the main spectacles 1 is provided on each detachable lens 20, the detachable lenses 20, 20 may be mounted in a more sure and stable state, and it becomes harder to release each detachable lens 20 from the corresponding lens 10.

According to the mounting structure of detachable lenses to main spectacles according to the present invention as defined in claim 3, since the stopper portion 26 pressed against the main spectacles 1 is provided on each detachable lens 20, the detachable lenses 20, 20 may be mounted in a more sure and stable state, and it becomes harder to release each detachable lens 20 from the corresponding lens 10, similarly to the mounting structure according to the present invention as defined in claim 2.

According to the mounting structure of detachable lenses to main spectacles according to the present invention as defined in claim 5, since the detachable lenses 20, 20 are connected together through the bridge portion 21 to from the auxiliary spectacles 2, it is possible to mount the detachable lenses 20, 20 more simply, and also to provide a more sure and stable mounting state, and it becomes harder to release each detachable lens 20 from the corresponding lens 10, in comparison with the mounting structure as defined in claim 1.

According to the mounting structure of detachable lenses to main spectacles according to the present invention as defined in claim 6, since the hook portion 25 hitched on the main spectacles 1 is provided on the auxiliary spectacles 2, the auxiliary spectacles 2 may be mounted in a more sure and stable state, and it becomes harder to release each detachable lens 20 of the auxiliary spectacles 2 from the corresponding lens 10 of the main spectacles 1, in comparison with the mounting structure as defined in claim 4.

According to the mounting structure of detachable lenses to main spectacles according to the present invention as defined in claim 7, since the stopper portion 26 pressed against the main spectacles 1 is provided on the auxiliary spectacles 2, the auxiliary spectacles 2 may be mounted in a more stable and sure state, and it becomes harder to release each detachable lens 20 of the auxiliary spectacles 2 from the corresponding lens 10 of the main spectacles 1, similarly to the mounting structure as defined in claim 5.

According to the mounting structure of detachable lenses to main spectacles according to the present invention as defined in claim 8, since the bridge portion 21 of the auxiliary spectacles 2 is formed to be hitched on the bridge portion 11 of the main spectacles 1, the auxiliary spectacles 2 may be mounted to the lenses 10, 10 of the main spectacles 1 more simply, and it becomes harder to release each detachable lens 20 from the corresponding lens 10.

According to the mounting structure of detachable lenses to main spectacles according to the present invention as defined in claim 9, since the main spectacles 1 include the rimless spectacles with no lens frame, it is possible to provide spectacles lighter in weight than spectacles with lens frames, and a field of vision is less obstructed in use.

According to the mounting structure of detachable lenses to main spectacles according to the present invention as defined in claim 4 or 10, since the first or second magnetically-fitting piece 14 or 24 is mounted through the support piece 24a bent to the side of the corresponding lens 10 of the main spectacles 1, the field of vision is hardly obstructed by the first and second magnetically-fitting pieces 14, 24 in a state that each second magnetically-fitting piece 24 is magnetically fitted to the corresponding first magnetically fitting piece 14.

According to the mounting structure of detachable lenses to main spectacles according to the present invention as defined in claim 11, since either of the first and second magnetically-fitting pieces 14, 24 has the guide projection 13, and the other has the guide hole 23 allowing the guide projection 13 to guide thereinto, the first and second magnetically-fitting pieces 14, 24 are magnetically fitted to each other the moment that each guide projection 13 is guided into the corresponding guide hole 23, and as a result, the detachable lenses 20, 20 may be mounted to the lenses 10, 10 of the main spectacles 1 more simply.

Further, since the magnetically-fitting piece 14 or 24 and the guide hole 23 or the guide projection 13 are formed as one body, the number of parts may be reduced, resulting in a simplification of steps of assembly.

What is claimed is:

1. A mounting structure of detachable lenses to main spectacles, comprising:

main spectacles; and a detachable lens mounted to the surface side of each lens of said main spectacles one over the other;

wherein a first magnetically-fitting piece is provided on one of the circumference of each lens and that of each detachable lens mounted to said lens one over the other, while a second magnetically-fitting piece magnetically fitted to the corresponding first magnetically-fitting piece is provided on the other;

guide projections are provided symmetrically on one of the circumference of each lens and that of each detachable lens mounted to said lens one over the other, while a guide hole allowing the corresponding guide projection to guide thereinto is provided in the other.

2. A mounting structure of detachable lenses to main spectacles according to claim 1, wherein a hook portion hitched on said main spectacles is provided at a position symmetrically corresponding to said first or second magnetically-fitting piece on the circumference of each detachable lens.

3. A mounting structure of detachable lenses to main spectacles according to claim 1, wherein a stopper portion pressed against said main spectacles is provided at a position symmetrically corresponding to said first or second magnetically-fitting piece on the circumference of each detachable lens.

4. A mounting structure of detachable lenses to main spectacles according to claim 1, wherein said first or second magnetically-fitting piece provided on each detachable lens is mounted through a support piece bent to the side of the corresponding lens of said main spectacles.

5. A mounting structure of detachable lenses to main spectacles according to claim 1, wherein said main spectacles include rimless spectacles.

6. A mounting structure of detachable lenses to main spectacles according to claim 1, wherein the guide projection is formed on one of said first and second magnetically-fitting pieces, and the guide hole allowing said guide projection to guide thereinto is formed in the other.

7. A mounting structure of detachable lenses to main spectacles, comprising:

main spectacles;

a detachable lens mounted to the surface side of each lens of said main spectacles one over the other;

wherein said detachable lenses are connected together through a bridge portion to form auxiliary spectacles of a detachable type;

a first magnetically-fitting piece is provided on one of the side of said auxiliary spectacles and that of said main spectacles, while a second magnetically-fitting piece magnetically fitted to the corresponding first magnetically-fitting piece is provided on the other;

a guide projection is provided in one of at least one place on the circumference of each detachable lens and at least one place, which corresponds to said one place, on the circumference of each lens, while a guide hole allowing said guide projection to guide thereinto is provided in the other.

8. A mounting structure of detachable lenses to main spectacles according to claim 7, wherein a hook portion hitched on said main spectacles is provided at a position symmetrically corresponding to said first or second magnetically-fitting piece on said side of said auxiliary spectacles.

9. A mounting structure of detachable lenses to main spectacles according to claim 7, wherein a stopper portion pressed against said main spectacles is provided at a position symmetrically corresponding to said first or second magnetically-fitting piece on said side of said auxiliary spectacles.

10. A mounting structure of detachable lenses to main spectacles according to claim 7, wherein said bridge portion of said auxiliary spectacles is hitched on a bridge portion of said main spectacles.

11. A mounting structure of detachable lenses to main spectacles according to claim 7, wherein said first or second magnetically-fitting piece provided on said auxiliary spectacles is mounted through a support piece bent to the side of the corresponding lens of said main spectacles.

12. A mounting structure of detachable lenses to main spectacles according to claim 5, wherein said main spectacles include rimless spectacles.

13. A mounting structure of detachable lenses to main spectacles according to claim 5, wherein the guide projection is formed on one of said first and second magnetically-fitting pieces, and the guide hole allowing said guide projection to guide thereinto is formed in the other.

* * * * *